B. S. McCLELLAN.
REFRIGERATING APPARATUS.
APPLICATION FILED DEC. 31, 1915. RENEWED OCT. 6, 1917.
1,254,519. Patented Jan. 22, 1918.
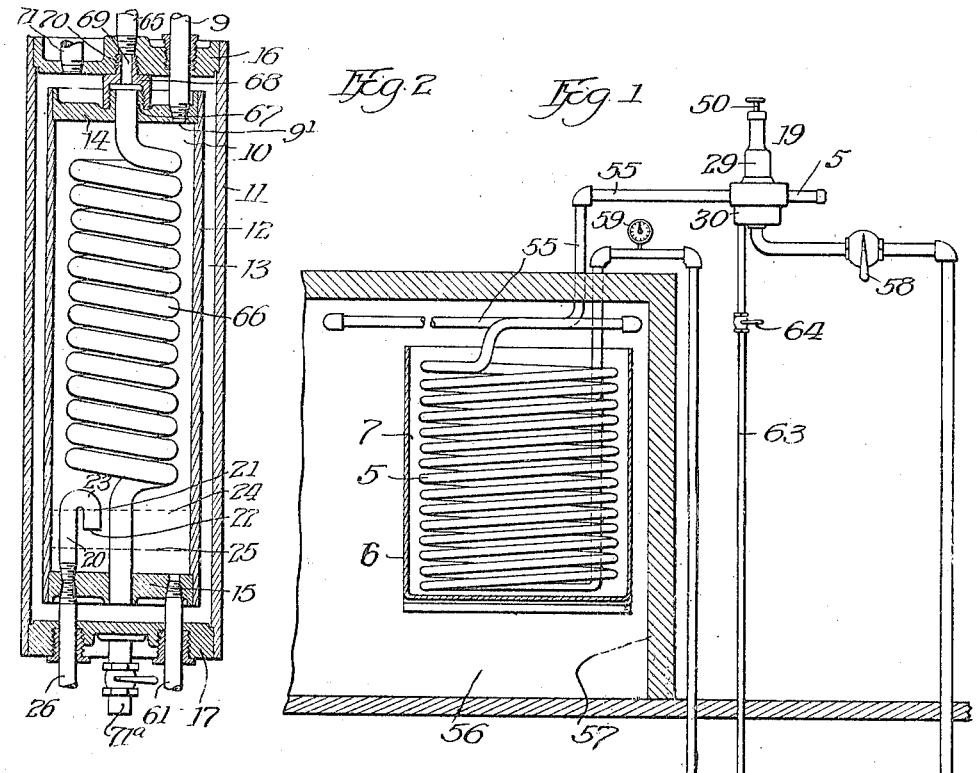

UNITED STATES PATENT OFFICE.

BENJAMIN S. McCLELLAN, OF CHICAGO, ILLINOIS.

REFRIGERATING APPARATUS.

1,254,519.   Specification of Letters Patent.   Patented Jan. 22, 1918.

Application filed December 31, 1915, Serial No. 69,705. Renewed October 6, 1917. Serial No. 195,203.

*To all whom it may concern:*

Be it known that I, BENJAMIN S. MCCLELLAN, a citizen of the United States, residing in Chicago, in the county of Cook and State of Illinois, have invented certain new and useful Improvements in Refrigerating Apparatus, of which the following is a specification.

The principal objects of the invention are to provide a simple, economical and efficient refrigerating apparatus comprising improved means for separating oil from a refrigerating agent or volatile fluid, such as fluid ammonia, in such a manner as to render the volatile fluid as completely free from oil as possible; and to enable the volatile fluid or ammonia to be used over and over again repeatedly as a refrigerating agent in a condition as free from oil as possible, and the oil to be used over and over again for the purpose of lubrication. Matter herein described and disclosed, but not claimed, will be found described and claimed in an application Serial No. 163,314, filed by me and in my name in the United States Patent Office April 19, 1917, and allowed April 25, 1917, for an improvement in refrigerating apparatus, and oil separator and condenser mechanism therefor, to which reference is hereby made.

Other and further objects of the invention will appear from an examination of the following description and claims, and from an inspection of the accompanying drawings, which are made a part hereof.

The invention consists in the features, combinations and parts, and in the process of separating oil from fluid ammonia, herein described and claimed.

In the accompanying drawings,

Figure 1 is a diagrammatic view of a refrigerating apparatus constructed in accordance with my invention and improvements and adapted to be used in the practice of my improved process of separating oil from a volatile fluid, or refrigerating fluid;

Fig. 2, a detail view in central vertical section of a condenser, provided with means for separating oil from volatile fluid within the condensing chamber, in accordance with my invention and improvements, and Fig. 3, an enlarged detail view in central vertical section of my improved expansion valve mechanism provided with an oil recep tacle and adapted to enable the oil to be separated from the volatile fluid at the instant of expansion of the volatile fluid into gaseous form.

In constructing a refrigerating apparatus in accordance with my invention and improvements, I provide a compressor or pump 1, having a piston or compression chamber 2, and a crank and pitman-containing chamber or casing 3 mounted upon a suitable support, such as a frame 4, which may be of any desired ordinary, well-known or suitable form.

An expansion coil or refrigerating coil 5 is arranged in a suitable coil-containing casing or receptacle 6, adapted to form a liquid-containing chamber 7 for containing liquid, such as brine, to be cooled. An outlet or return pipe 8 communicates with the discharge end of the expansion coil and forms a passage which communicates with the in let and interior of the compression chamber 2.

The piston chamber or compression chamber 2 of the compressor is provided with an outlet pipe or passage 9 leading from the compression side or high pressure side of said chamber and communicating with the interior of a condensing chamber 10 formed within the inner condenser casing 12.

A very desirable improved form of con denser is shown in Figs. 1 and 2 of the drawings and comprises a cylindrical outer casing 11 and an inner casing having, preferably, cylindrical side walls of less diameter in cross-section than the outer casing 11, and being thus adapted to provide an annular space 13 between the inner casing walls 12 and the outer casing wall 11 for containing a cooling liquid. The upper extremity of the hollow inner casing 12 is closed by means of a head or end member 14, and the lower extremity of said casing is closed by means of a similar lower head or end member 15. The upper extremity of the hollow outer casing is closed by an upper outer head or cas ing member 16, and the lower extremity of said outer casing is closed by means of a similar lower head or outer bottom casing member 17. (See Fig. 2.)

The interior space or condensing chamber 10, which is inclosed by the inner casing 12 has a gas inlet 9' with which the pipe 9 from the compression chamber of the compressor communicates and is adapted to contain a volatile fluid, such as liquid ammonia, or ammonia in gaseous form, or in process of being changed from gaseous to liquid form to be used for refrigerating purposes, and is provided with a volatile liquid outlet passage leading from said interior condensing chamber 10 and communicating with the receiving port or liquid containing chamber 18 of a pressure-controlled expansion valve mechanism 19. The volatile fluid or ammonia is subjected to pressure and to the action of a cooling agent while in the condensing chamber 10, the pressure being applied by the operation of the compressor thus causing a change of state of said fluid and condensing and converting the same from gaseous to liquid form. A liquid receptacle or tank 27 may be interposed between the condenser and the expansion valve and form a part of said passage. Said passage or conduit, when constructed as shown in the drawings is adapted to permit the escape of liquid ammonia and to prevent the escape of gas and oil through said passage, and comprises an interior pipe or tube portion 20, which projects upwardly on the inside of the condensing chamber 10 from the bottom of said chamber, and has a depending upper pipe, tube or cap portion 21, which may be in the form of a downwardly extending elbow or pipe portion. The curved tube or inner conduit member comprising the parts 20, 21, and 23, is thus adapted to provide a liquid outlet passage, and to cause a liquid seal for such passage to be formed by the liquid ammonia contained in the condensing chamber and filling the mouth or bottom opening 22 of the depending pipe or cap portion 21. The liquid ammonia is thus permitted to pass out through the liquid conduit or outlet thus formed, and it will be readily seen that the escape of volatile fluid in gaseous form is prevented by the liquid seal or sealed volatile liquid outlet passage thus provided, and that the oil,—the upper surface of which is at all times below the level of the opening 22, and below the volatile liquid or liquid ammonia in said chamber,—will be arrested and retained within the chamber 10 while the liquid ammonia is permitted to escape. The oil thus separated from and collected beneath the volatile fluid or ammonia in said chamber is in condition to be drawn off, separately from the volatile fluid, and returned to the crank casing of the compressor for use as a lubricant.

A pipe 26, secured to the bottom of the inner casing 12, forms a passage which leads from the interior tubular portion 20 and curved or sinuous liquid-sealed outlet passage, above described, into pipe 28, or which may communicate with the interior of a liquid receptacle or tank 27, which is provided with an outlet pipe 28 leading from said liquid containing tank 27 to the receiving space or chamber 18 of the expansion valve, above mentioned.

A water supply pipe 65 which is controlled by a water supply cock 101, extends through the head 16 of the outer casing of the condenser, and is connected with the receiving end of an inner cooling coil 66, located on the inside of the condensing chamber 10. The pipe and coil are connected, by preference, by means of a threaded boss 67, which is integral with the inner head 14 of the inner casing, and into which the upper end of the coil 66 is tightly fitted, and a threaded cap or bushing 68, which is mounted in threaded engagement with the boss 67 in position to inclose the upper open end of the coil 66, said cap or bushing 68 being provided with a passage 69 therethrough, and having an upper threaded end portion 70 in threaded engagement with the head 16 of the outer casing 11. The bushing or cap 68 thus forms a passage which connects or communicates with the passage formed by the water supply pipe 65, and the interior of the coil 66. The lower or discharge end of the coil 66 is, by preference, mounted in position to extend through the axial opening in the bottom head 15 of the inner casing 12, into which the end of the coil is tightly fitted in such position that the open bottom end of the coil communicates with the space or water jacket compartment 13 which entirely surrounds the inner casing 12 on all sides, and at top and bottom; said space being adapted to contain cooling water, which entirely surrounds the inner casing 12. The water containing coil 66 is entirely surrounded by the casing 12, and by the volatile fluid or fluid ammonia under pressure contained in the chamber 12. The volatile fluid is thus subjected to the action of a cooling agent on both the inside and outside of the chamber 10.

A water pipe or conduit 71 has its upper extremity closely fitted into an opening in the head 16 through which it extends, so as to form a water outlet passage leading from the interior or water containing space 13 within the outer casing 11 of the condenser, and which space surrounds the inner chamber 10; the opposite extremity of said pipe 71 being connected with the outer casing or water jacket of the compressor cylinder 2, and adapted to communicate with the interior or water containing space of such water jacket.

A water outlet pipe 72 is connected with the outlet opening of the water jacket of the compressor cylinder 2, and forms a passage which, by preference, communicates with the interior of a piston casing 73, in which is mounted a reciprocating piston 74 for operating an electric switch 75. (See Fig. 1). The piston 74 is operatively connected with the electric switch 75 by means of suitable lever mechanism 76 and spring mechanism 77¹ adapted to operate the electric switch 75 for controlling the supply of electric current to drive the electric motor, by means of which the compressor is operated.

The electric motor 77 is operatively connected with the compressor, already described, by means of a belt-pulley 78 on the driving shaft 79 of the motor, and a belt 80 operatively connected with said belt pulley and with the driving wheel 81 of the compressor.

The motor is operatively connected with an electric circuit or source of supply and with the switch operating mechanism for automatically opening and closing such electric circuit, by means of an electric wire 82 connected with a brush 83 of a dynamo 84, and with one of the poles 85 of the motor, and an electric wire 86 connected with the opposite pole 87 of the motor, and with the contacts 86 of the knife-switch 75, which contacts are adapted to be engaged by and to be released from engagement or contact with the arms of said knife-switch 75. The arms of the switch are connected or in contact with fuses 89, and a wire 99 is connected with the fuses 89 and with a brush 100 of the dynamo 84.

The switch and switch-operating mechanism employed for the above mentioned purposes is described, illustrated and claimed in a pending application, Serial No. 30,112, filed May 24, 1915, for electric switches, &c., and it is therefore not deemed necessary or desirable to further describe or illustrate the same herein.

My improved expansion valve mechanism 19 comprises in its construction an upper valve casing portion 29, and a lower valve casing portion 30, which are clamped or secured together by means of headed bolts 31 and nuts 32 in threaded engagement with said securing bolts, or by other suitable securing means.

The lower casing member 30 has an inner hollow core or central casing portion 33, the upper extremity of which is adapted to form a valve seat, and is provided with a vertical axial opening 34 therein in which is slidably mounted the upright stem 35 of a fluid pressure controlled spring pressed movable valve member 36. The hollow inner casing or wall portion 33 projects upward within and is, by preference entirely surrounded by an expansion chamber 37, having a lower annular oil-containing portion or oil reservoir portion 38 located below the level of the openings 39 for permitting the passage of volatile fluid or ammonia from said expansion chamber 37 to the expansion coil or coils. Said annular lower oil-containing portion or oil reservoir surrounds the valve seat or inner casing portion 33 below the level of the inlet port or ports 43 in the periphery of the valve stem and leading into chamber 37 from an axial passage 41 having one or more lateral bottom inlet openings 42 leading into passage 41 from the cylindrical peripheral surface of the stem and adapted to be opened and closed by the annular valve-stem-encircling portion 43' of the core or casing part 33. The depending or end portion of said valve-stem below said openings 42 is imperforate. One or more lateral openings 43 lead from the upper extremity of the axial opening 41 in the valve stem 33 and outward laterally to the outside of the upper portion of the valve-stem and communicate with the interior of the expansion chamber 37. The intermixed oil and volatile fluid or fluid ammonia admitted through the small openings 42 in the valve-stem is strained and the particles of oil and volatile refrigerating fluid are separated as they pass in minute streams or jets and are discharged into the expansion chamber 37 from the small passages 41, 42 and 43 in the valve-stem. The separation of the oil particles from the particles of the ammonia or volatile fluid takes place at the moment when a portion of the latter expands and is cooled and converted from liquid into gaseous form in the expansion chamber of the valve casing. The volatile fluid and oil are thus cooled in said expansion chamber while said materials are in small particles or in a finely divided condition after passing through the minute passages or openings in the valve mechanism. The cooled volatile fluid is permitted to pass into and across the unbridged space formed by the annular chamber 37, and the particles of oil are arrested and caused to drop or run down into the lower oil-containing portion 38 of the chamber 37, so as to be conducted from said chamber back into the crank case 3 of the compressor through the pipe 63 when the cock 64 is opened.

A diaphragm 44, which is made, by preference, of flexible material, is mounted in position to extend between the upper portion 45 of the valve member 36 already described, and a cap or piston member 46. A relatively light compressible spring 47 encircles the valve-stem of the valve member 36, and has its bottom extremity in engagement with the core 33, and its upper extremity in engagement with said valve member 36, and adapted to tend to press said valve member upward, or in the direction of valve closing position. A relatively heavy compressible spring 48 is mounted between an upper spring-engaging cap 49 and the cap 46, already described, and is adapted to press the latter, and also the valve diaphragm 44 and movable valve member 36 downward, or in a direction which will cause the inlet openings 42 in the valve-stem 35 to be opened by being thus moved downward or away from the bottom of the valve-stem-encircling part 43', to admit volatile fluid or ammonia into said openings 42, and into the chamber 37 when the fluid pressure in said chamber is reduced sufficiently to permit the action of the spring 48 to operate the valve-stem or movable valve member.

Means for regulating the tension of the spring 48 is provided, which may be in the form of a screw-rod 50, which is mounted in threaded engagement with the upper valve casing portion 29, and has its lower end in operative engagement with the upper cap 49, so as to resist the upward movement of said cap as the latter is pressed upward against the tension of said spring 48.

The flexible diaphragm 44 is clamped between the upper valve casing member 29 and the lower valve casing member 30, and is adapted to form a gas proof and liquid proof connection between said casing members and between the expansion chamber 37 and the spring-containing compartment 51.

The passage of volatile refrigerating fluid into the expansion chamber 37 and expansion coil is automatically controlled by the expansion valve mechanism, so as to increase in quantity or volume proportionately as the pressure decreases, and decrease proportionately as the pressure increases in said chamber and coil, thus preventing the flooding of the expansion coil, or the admission of ammonia in liquid form, or oil thereto, and preventing the building up of an excessive or dangerous pressure in the compressor or in any of the refrigerating fluid passages.

A packing 52 of compressible packing material of any ordinary or well-known form, is provided and secured in position around the upper portion of the threaded rod 50 by means of a packing gland 53 and cap 54, or similar element.

A pipe 55 leads from the corresponding outlet 39 in the upper portion of the expansion chamber 37, (see Figs. 1 and 3), and is connected and communicates with the interior and upper portion of the expansion coil already described, the discharge end or bottom extremity of said coil 5 being connected and adapted to communicate with the receiving side and interior of the compressor or piston chamber by means of the pipe 8, already described. It is obvious that there may be as many pipes 55 and as many expansion coils as may be desired.

The expansion coil 5 and the liquid containing tank 6, in which the coil is located, are adapted to be placed in a compartment 56, which may be of any desired form or dimensions, adapted to provide an inclosed space or compartment 57 for containing articles to be cooled or maintained at a desired temperature.

A cock 58 of suitable form mounted upon the pipe 28 is adapted to be used when making repairs, or when desired to open and close the passage formed by said pipe and leading into the expansion valve casing. A pressure-gage, or indicator, 59, is connected with the return pipe 8 and adapted to indicate the degree of pressure on the low pressure side of the refrigerating system or apparatus; and a pressure-gage or indicator 60 is connected with the pipe 9 and adapted to indicate the degree of pressure on the high pressure side of the refrigerating system or apparatus.

The crank and pitman-containing chamber or casing 3 of the compressor is adapted to contain, and in practice is provided with a quantity of lubricating oil for lubricating the moving parts of the compressor, particularly the crank and pitman connections and the piston mechanism, all of which may be of any desired ordinary and well-known form, as already suggested; and an oil conduit, consisting of a pipe or tube 61, leads from the bottom of the interior condensing chamber 10 of the condenser, and communicates with the interior of the crank containing space or crank casing 3 of the compressor, and is provided with a cock 62 for opening and closing the passage formed by said pipe. The ammonia or refrigerating fluid which is under pressure in the condensing chamber, and a portion of which fluid is in gaseous form, tends to force oil from the bottom of said chamber into the crank casing 3 or main oil reservoir, when the cock 62 is open.

An oil conduit in the form of a pipe 63 leads from the lower annular oil-containing portion 38 of the expansion chamber 37 in the expansion valve casing already described, and communicates with the interior of the crank-containing chamber or crank casing 3 of the compressor, and may be connected with the pipe 61. A cock 64, which may be of the same form as cock 62, or of any suitable ordinary and well known form adapted to open and close the passage formed by the pipe 63, is connected with said last mentioned pipe at a point somewhat below the level of the bottom portion 38 of the expansion chamber 37. The annular bottom portion 38 of said expansion chamber and the portion of the pipe 63 above the cock 64 are thus adapted to form an oil receptacle. The hollow inner casing portion which forms the valve seat for the pressure-controlled movable valve member 36, and the stem of said valve member, are thus surrounded by the annular portion of the oil reservoir or oil receptacle thus formed; and the oil receptacle and said pipe 63 are adapted to enable oil arrested in the oil reservoir portion 38 of the expansion chamber above described, to be forced from said expansion chamber by the action of fluid pressure within said chamber and connected passages, directly into the main oil reservoir formed by the crank casing 3, and into position to be used in said crank casing, for lubricating purposes.

The condenser, constructed as above described, is, by preference so mounted with relation to the oil-containing chamber formed by the crank casing 3 of the compressor, that the liquid-containing portion of the condensing chamber and the top surface of the refrigerating fluid in liquid form contained in the condensing chamber will be normally below the level of the point at which the oil pipe 61 leading from the condensing chamber 10 communicates with the interior of the crank casing. And the point at which the pipe 61 communicates with the interior of the condensing chamber 10 is below the level of said point of communication of the pipe 61 with the crank casing, and below the level of the liquid-sealed opening 22 or refrigerating fluid outlet of the condensing chamber.

The crank casing is of course suitably packed in the ordinary manner, so as to prevent leakage of fluid therefrom. And a pipe 91 leads from the interior of the crank casing at a point above the normal level of any oil to be contained therein, and communicates with the piston chamber, and has a valve 92. Pressure may thus be reduced by pumping ammonia through pipe 91.

In the operation of the refrigerating apparatus above described, a suitable quantity of volatile refrigerating fluid, such as liquid ammonia, is provided and introduced into the connected refrigerating-fluid-containing compartments and passages of the apparatus; and the oil required for lubricating the moving parts of the compressor, including the piston, and pitman and crank mechanism, is introduced into the crank casing of the compressor. In practice a portion of the lubricating oil becomes intermixed with the volatile refrigerating fluid or ammonia, in the compression chamber. It is well known that, unless separated from the ammonia or refrigerating fluid, the oil will pass with the refrigerating fluid into and through the condenser, the expansion valve mechanism, the expansion coil, and the conduits which connect said devices, and which, with the compression chamber of the compressor, all form a continuous or endless volatile-refrigerating-fluid containing passage, when the expansion valve mechanism is in passage-opening position and the apparatus is in operation. Lubricating oil thus admitted would tend to coat the inner walls of the expansion coil and to produce a detrimental effect, in that the oil would tend to prevent or retard the absorption of heat by the refrigerating fluid.

In separating the oil from the volatile refrigerating fluid in accordance with my improved process, the volatile refrigerating fluid, together with the oil intermixed therewith and which is to be separated therefrom, is introduced or caused to pass into the condensing chamber while the volatile refrigerating fluid is in a gaseous state and while the oil intermixed therewith is partly or wholly in the form of a vapor. The mixture comprising volatile refrigerating fluid in a gaseous state, and oil is introduced into the condensing chamber under pressure, and while in the condensing chamber is simultaneously subjected to pressure sufficient to cause a change of state of the volatile refrigerating fluid from that of a gas to that of a liquid—and to the action of a cooling medium or agent. The cooling medium is by preference in the form of a current of water under pressure passing through the water passage or passages of the condenser.

The volatile refrigerating fluid thus changed from a gaseous to a liquid state is forced or caused to pass, in a liquid state, from the condensing chamber into the liquid-receiving space or chamber 18 of the expansion valve device 19, and through the restricted passage or passages controlled by the movable valve member 36 of the expansion valve mechanism, and into the expansion chamber 37 on the low pressure side of said pressure-controlled valve member 36, in which chamber the refrigerating fluid is subjected to a varying but comparatively low pressure, such for instance as 15 pounds pressure per square inch, or thereabout, as already suggested, and a portion of the volatile fluid or ammonia is there permitted to rapidly expand and become cooler, and is changed from a liquid to a gaseous state as it passes into said expansion chamber in the expansion valve casing above described. Simultaneously with and during the transition or change and expansion of the said portion of the volatile refrigerating fluid from a liquid to a gaseous state, and while the temperature of the refrigerating fluid is becoming lower, such particles of oil as remain intermixed with the volatile refrigerating fluid thus expanding or undergoing a change of state, are rapidly cooled and rendered more dense or hardened, and are separated from the volatile refrigerating fluid and arrested within the oil reservoir or lower portion of the expansion chamber. The density of the particles of oil being increased by thus cooling or lowering the temperature of the mixture or fluid in which the oil is contained, the oil particles, being heavier than the adjacent particles of volatile refrigerating fluid, are enabled to flow or fall downward into the lower portion of the expansion chamber of the expansion valve device and become separated from the volatile refrigerating fluid; and the volatile refrigerating fluid, a portion of which is in gaseous form, is permitted to pass over the oil and across the unobstructed and unbridged space formed by the expansion chamber in the lower portion of which the oil is arrested, and to the expansion coil. The gas or volatile refrigerating fluid is free from oil and in condition to be used over and over again.

I claim:

1. In a refrigerating apparatus of the class described, the combination of an expansion coil, a valve casing having a liquid inlet passage adapted to communicate with a source of volatile fluid supply, an expansion chamber having a volatile fluid outlet passage communicating with the expansion coil, a valve-controlled connecting passage adapted to connect said liquid inlet passage and said expansion chamber, an oil-containing reservoir extending below the level of the volatile fluid outlet passage and communicating with the expansion chamber, said oil-containing reservoir being located between said valve-controlled connecting passage and the expansion coil, and an oil outlet passage communicating with said oil-containing reservoir.

2. In a refrigerating apparatus of the class described, the combination of an expansion coil, a valve casing having a liquid ammonia inlet passage adapted to communicate with a source of liquid ammonia supply, and having an expansion chamber provided with an ammonia outlet passage communicating with the expansion coil, said casing having a partition portion extending between said liquid inlet passage and said expansion chamber and provided with an opening for receiving a movable valve member, a movable valve member mounted in said opening and provided with a fluid passage adapted to be controlled by the movement of said movable valve member, for connecting said inlet passage and said expansion chamber, said expansion chamber having a lower oil-containing reservoir portion extending below the level of said outlet passage and communicating with the volatile-fluid-containing portion of the expansion chamber at a point between the valve-controlled-connecting passage and the expansion coil, and means for permitting the removal of oil from the oil reservoir.

3. In a refrigerating apparatus of the class described, the combination of an expansion coil, a valve casing having a liquid ammonia inlet passage, an expansion chamber having an oil reservoir and provided with an ammonia outlet passage adapted to communicate with the expansion coil, said casing having a partition portion intermediate said liquid inlet passage and said expansion chamber and provided with an opening for receiving a movable valve member, a movable valve member mounted in said opening and provided with a restricted fluid passage adapted to be controlled by the movement of said movable valve member, and forming a connection between the liquid inlet passage and the expansion chamber when the movable valve member is in passage opening position, automatic pressure-controlled mechanism operatively connected with the movable valve member, for automatically operating the same, means for introducing liquid ammonia into said inlet passage, and means for permitting the removal of oil from the oil reservoir.

4. In a refrigerating apparatus of the class described, the combination of a compressor having a compressor chamber, and provided with an oil reservoir adapted to contain oil for lubricating the compressor mechanism, an expansion valve casing having a liquid inlet passage, and provided with an expansion chamber having a volatile fluid outlet passage adapted to communicate with an expansion coil, said expansion chamber of the valve casing having a lower oil-containing reservoir portion located below the level of said outlet passage and adapted to contain particles of oil separated from volatile fluid in said expansion chamber, a condenser having a condensing chamber provided with a volatile fluid inlet passage communicating with the compression chamber of the compressor, and having a liquid outlet passage communicating with the liquid inlet passage of said valve casing, an expansion coil connected with the volatile fluid outlet passage of the expansion chamber of the expansion valve casing, and having a return passage communicating with the compression chamber of the compressor, pressure-controlled valve mechanism provided with a valve-controlled connecting passage adapted to communicate with the liquid inlet passage in the valve casing, and with the expansion chamber, and means for permitting the removal of oil from the oil-containing reservoir portion of said expansion chamber.

5. In a refrigerating apparatus of the class described, the combination of a compressor having a compressor chamber, and provided with an oil reservoir adapted to contain oil for lubricating the compressor mechanism, an expansion valve casing having a volatile liquid inlet passage, and provided with an expansion chamber having a volatile fluid outlet passage adapted to communicate with an expansion coil, said expansion chamber of the valve casing having a lower oil-containing reservoir portion located below the level of said outlet passage and adapted to contain particles of oil separated from volatile fluid in said expansion chamber, a condenser having a condensing chamber provided with a volatile fluid inlet passage communicating with the compression chamber of the compressor, and having a liquid outlet passage communicating with the liquid inlet passage of said valve casing, an expansion coil connected with the volatile fluid outlet passage of the expansion chamber of the expansion valve casing, and having a return passage communicating with the compression chamber of the compressor, pressure-controlled valve mechanism provided with a valve-controlled connecting passage adapted to communicate with the liquid inlet passage in the valve casing, and with the expansion chamber, and an oil conduit forming an oil outlet passage leading from the oil-containing reservoir portion of said expansion chamber and adapted to communicate with the oil reservoir of the compressor.

BENJAMIN S. McCLELLAN.

Witnesses:
HARRY IRWIN CROMER,
W. HARDING.